United States Patent
Ehly et al.

(10) Patent No.: US 11,453,756 B1
(45) Date of Patent: Sep. 27, 2022

(54) OXO-BIODEGRADABLE EXPANDED POLYSTYRENE

(71) Applicant: Plastilite Corporation, Omaha, NE (US)

(72) Inventors: Jon Ehly, Omaha, NE (US); Jacob Martinez, Omaha, NE (US)

(73) Assignee: Plastilite Corporation, Omaha, NE (US)

( * ) Notice: Subject to any disclaimer, the term of this patent is extended or adjusted under 35 U.S.C. 154(b) by 310 days.

(21) Appl. No.: 16/654,329

(22) Filed: Oct. 16, 2019

Related U.S. Application Data

(60) Provisional application No. 62/746,816, filed on Oct. 17, 2018.

(51) Int. Cl.
*C08J 9/18* (2006.01)
*C08J 9/228* (2006.01)
*C08J 9/00* (2006.01)

(52) U.S. Cl.
CPC .............. *C08J 9/18* (2013.01); *C08J 9/0066* (2013.01); *C08J 9/228* (2013.01); *C08J 2201/032* (2013.01); *C08J 2201/034* (2013.01); *C08J 2325/06* (2013.01)

(58) Field of Classification Search
CPC ... C08J 9/18; C08J 9/0066; C08J 9/228; C08J 2201/032; C08J 2201/034; C08J 2325/06
See application file for complete search history.

(56) References Cited

U.S. PATENT DOCUMENTS

| | | | | |
|---|---|---|---|---|
| 4,446,208 | A * | 5/1984 | Schwarz | C08J 9/224 428/407 |
| 5,114,640 | A * | 5/1992 | Harclerode | B29C 44/08 264/53 |
| 6,221,926 | B1 * | 4/2001 | Oohara | C08J 9/18 521/59 |
| 2008/0300328 | A1 * | 12/2008 | Schellenberg | C08J 9/0023 521/60 |
| 2009/0189111 | A1 * | 7/2009 | Zamani | G10K 11/165 252/62 |
| 2012/0301648 | A1 * | 11/2012 | Serge Maxime Lefebvre | C08F 8/50 428/36.5 |

FOREIGN PATENT DOCUMENTS

CN 107056325 A * 8/2017 ............. C04B 28/00

* cited by examiner

*Primary Examiner* — Kara B Boyle
(74) *Attorney, Agent, or Firm* — Suiter Swantz pc llo

(57) ABSTRACT

A method for producing an oxo-biodegradable expanded polystyrene (EPS) product is disclosed. In embodiments, the method includes: providing a volume of polystyrene; providing a volume of one or more chemical additives; combining the volumes of polystyrene and one or more chemical additives to form a mixture; and expanding the mixture into an oxo-biodegradable expanded polystyrene (EPS) product.

17 Claims, 1 Drawing Sheet

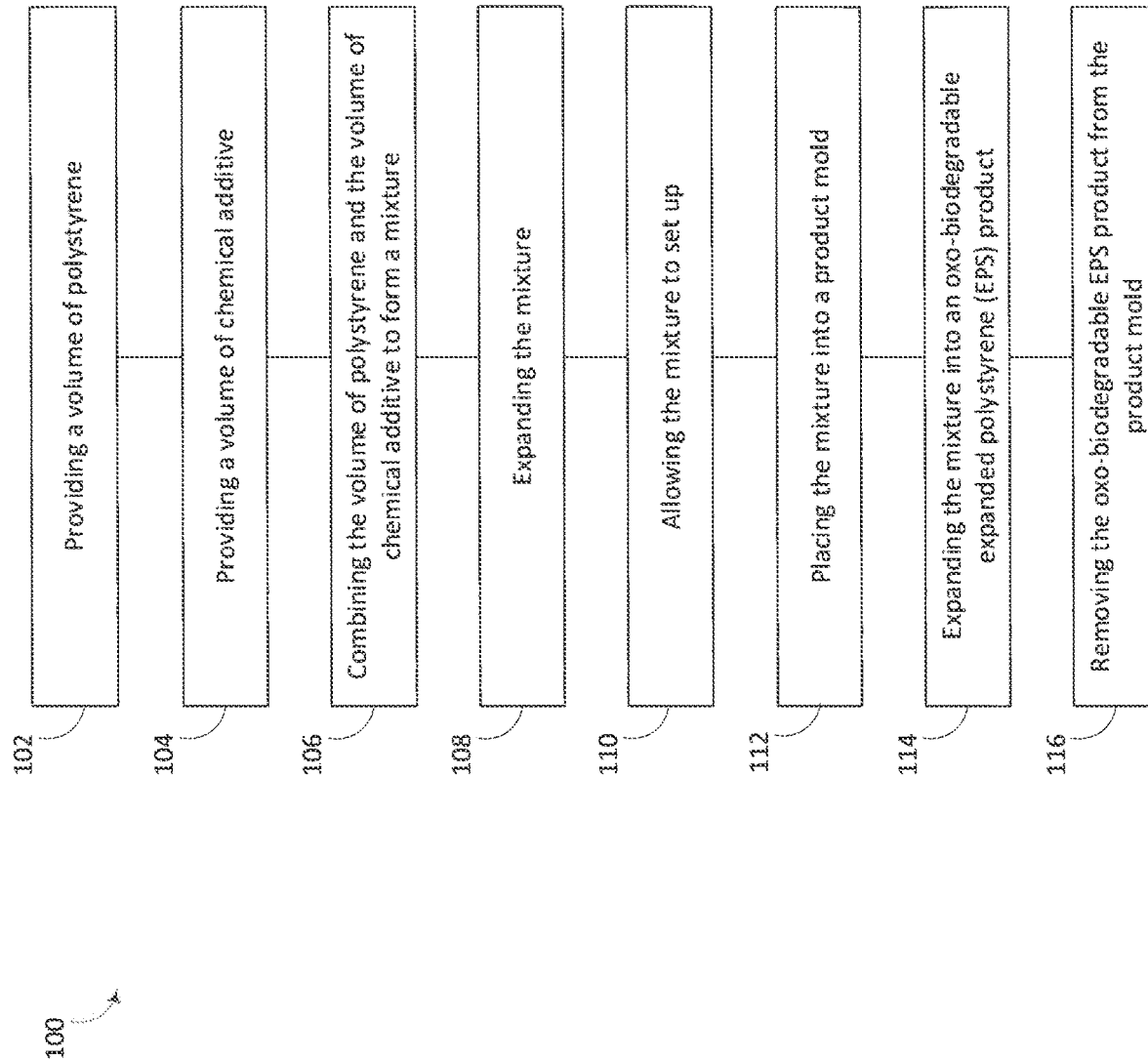

OXO-BIODEGRADABLE EXPANDED POLYSTYRENE

CROSS-REFERENCE TO RELATED APPLICATION

The present application claims priority to U.S. Provisional Patent Application No. 62/746,816, filed Oct. 17, 2018, entitled OXO-BIODEGRADABLE EXPANDED POLYSTYRENE, naming Jon Ehly and Jacob Martinez as inventors, which is incorporated herein by reference in the entirety.

TECHNICAL FIELD

The present invention generally relates to polystyrene, and, more particularly, to an oxo-biodegradable expanded polystyrene (EPS) product.

BACKGROUND

Expanded polystyrene (EPS) is a lightweight, durable, inert substance used to make various commercial products. EPS products are also exhibit thermally insulating and shock-absorbing properties, and have therefore been applied to a wide variety of applications. For example, EPS products are widely used for packaging and transporting other products, such as perishable food items, fragile materials, chemicals, and electronic equipment. However, EPS products may take several hundred years to biodegrade, leading to environmental concerns. Therefore, it would be desirable to provide a system and method which cure one or more of the shortfalls identified above.

SUMMARY

A method for producing an oxo-biodegradable expanded polystyrene (EPS) product is disclosed. In embodiments, the method includes: providing a volume of polystyrene; providing a volume of one or more chemical additives; combining the volumes of polystyrene and one or more chemical additives to form a mixture; and expanding the mixture into an oxo-biodegradable expanded polystyrene (EPS) product.

In some embodiments of the method, the volume of one or more chemical additives includes at least one of zinc ferrite, mixed metal oxide, or zinc stearate.

In some embodiments of the method, the volume of one or more chemical additives further includes at least one of an antioxidant, an oxidant, or an ultraviolet (UV) stabilizing additive.

In some embodiments of the method, the volume of one or more chemical additives further includes stearate.

In some embodiments of the method, the volume of one or more chemical additives is 17025 ISO certified.

In some embodiments of the method, combining the volumes of polystyrene and one or more chemical additives into a mixture includes combining the volumes of polystyrene and chemical additive into a mixture having 1 to 5% chemical additive content.

In some embodiments of the method, combining the volumes of polystyrene and one or more chemical additives into a mixture includes combining the volumes of polystyrene and one or more chemical additives into a mixture having 3% chemical additive content.

In some embodiments of the method, the oxo-biodegradable expanded polystyrene (EPS) product includes 91% or more polystyrene by weight.

In some embodiments of the method, providing a volume of polystyrene includes providing a volume of polystyrene beads.

In some embodiments of the method, providing a volume of polystyrene includes providing a volume of polystyrene beads impregnated with a volume of pentane gas.

In some embodiments of the method, the method further includes transferring the mixture into a product mold, and expanding the mixture into an oxo-biodegradable EPS product within the product mold.

In some embodiments of the method, expanding the mixture includes exposing the mixture to steam.

In some embodiments of the method, transferring the mixture into a product mold includes at least one of blowing, pouring, or scooping the mixture into the product mold.

In some embodiments of the method, the method further includes removing the oxo-biodegradable expanded polystyrene (EPS) product from the product mold.

In some embodiments of the method, the product mold includes at least one of a beverage cooler product mold, a transportation container product mold, a or packing peanut product mold.

In some embodiments of the method, combining the volumes of polystyrene and one or more chemical additives into a mixture includes combining the volumes of polystyrene and one or more chemical additives into a mixture with at least one of a mixer, a blender or a tumbler.

In some embodiments of the method, the oxo-biodegradable EPS product is configured to biodegrade in a period between one and three years.

In some embodiments of the method, providing the volume of one or more chemical additives includes mixing at least one of an antioxidant, an oxidant, or an ultraviolet (UV) stabilizing additive to a first volume of polystyrene.

An oxo-biodegradable expanded polystyrene (EPS) formed by a process is disclosed. In embodiments, the process includes: providing a volume of polystyrene; providing a volume of one or more chemical additives; combining the volumes of polystyrene and one or more chemical additives to form a mixture; and expanding the mixture into an oxo-biodegradable expanded polystyrene (EPS) product.

An oxo-biodegradable expanded polystyrene (EPS) comprising: a composition containing between 95 and 99% by weight polystyrene, and 0.1 to 5% by weight one or more chemical additives, the one or more chemical additives comprising at least one of zinc ferrite, mixed metal oxide, or zinc stearate.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1 illustrates a flowchart of a method for producing an oxo-biodegradable EPS product, in accordance with one or more embodiments of the present disclosure.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Expanded polystyrene (EPS) is a lightweight, durable product which is used in a wide variety of applications. The inert nature, high thermal conductivity, and shock-absorbent properties of EPS products particularly lend themselves to packaging and transportation applications. EPS products provide better protection than other major packaging alternatives, such as wood or corrugated paperboard products. As such, EPS products are commonly used to package and ship a wide variety of products including, but not limited to, fragile products (e.g., wine glasses, picture frames, wine/liquor bottles, and the like), perishable items (e.g., produce), refrigerated items (e.g., seafood, raw meat), electronics, chemicals, and the like.

It is noted herein that, over time, a vast majority of products and substances will degrade, and subsequently biodegrade. However, it is estimated that traditional expanded polystyrene (EPS) products may take several hundred years to biodegrade. The long biodegrading period of EPS products may lead to a variety of environmental concerns, including pollution, land conservation, wildlife harm, and the like.

The time periods required for products to degrade and biodegrade depends not only on the properties of the products/substances themselves, but on the characteristics of the surroundings. Traditional landfills are designed to prevent degradation and biodegradation from occurring, to the greatest extent possible. Degradation and biodegradation (e.g., anaerobic biodegradation) produce methane gas and leachate, a toxic liquid which may contaminate water supplies and other land areas if it is not contained. Accordingly, by preventing degradation and biodegradation, and therefore the production of methane gas and leachate, traditional landfills aim to simply contain and store waste, rather than break it down. Traditional landfills are further designed to limit waste exposure to oxygen, thereby limiting the ability of the waste products to biodegrade. As such, traditional landfills exhibit low oxygen content levels, and therefore low biodegradation levels. Studies have shown that traditional landfills may exhibit such low oxygen and biodegradation levels that even perishable items such as grapes and apples will not biodegrade in a forty-year timeframe.

Therefore, due to the low oxygen levels, traditional landfills may be ill-suited for oxo-biodegradable substances. Generally speaking, the terms "oxygen-biodegradation" or "oxo-biodegradation" refers to the process of reforming products (e.g., plastics) into food and fuel which may be metabolized by microorganisms.

As compared to traditional landfills, which are designed to prevent biodegradation, some modern landfills are designed to promote biodegradation, and may be referred to as "bioreactor landfills." In bioreactor landfills, ambient air including nitrogen ($N_2$) and oxygen ($O_2$) is pumped into the landfills in order to increase oxygen content levels and facilitate biodegradation. Thus, oxo-biodegradable products may readily biodegrade in bioreactor landfills. Furthermore, instead of preventing the production of methane gas, bioreactor landfills aim to generate and capture the largest amount of methane and other gasses as possible, which may then be used/sold for energy, research, or other purposes. In addition to producing gasses which may be used as fuel, bioreactor landfills may provide a number of additional environmental advantages, including conservation of land resources and reduction of long-term pollution.

Accordingly, embodiments of the present disclosure are directed toward EPS products which cure one or more shortfalls of previous EPS products identified above. Embodiments of the present disclosure are directed to expanded polystyrene (EPS) products produced with a chemical additive which are oxo-biodegradable. It is contemplated herein that the use of additives in the present disclosure may enable the creation of oxo-biodegradable EPS products which are biodegradable within several years (e.g., 2-3 years). Further, the oxo-biodegradable properties of the EPS products of the present disclosure may capitalize on the improved degradation characteristics of modern "bioreactor" landfills. Additional embodiments of the present disclosure are directed to EPS products which are completely recyclable. Other embodiments of the present disclosure are directed to a method of producing oxo-biodegradable EPS products with the use of a chemical additive.

FIG. 1 illustrates a flowchart of a method 100 for producing an oxo-biodegradable EPS product, in accordance with one or more embodiments of the present disclosure.

In a step 102, a volume of polystyrene is provided. In one embodiment, the volume of polystyrene includes a volume of polystyrene beads. In another embodiment, the volume of polystyrene includes a volume of polystyrene beads which are impregnated with a volume of pentane gas.

In a step 104, a volume of one or more chemical additives are provided. In embodiments, the one or more chemical additives may alter the physical and chemical characteristics of the polystyrene in order to produce oxo-biodegradable EPS products. The chemical composition of the volume of one or more chemical additives used to produce oxo-biodegradable EPS products may be shown by Table 1 below:

TABLE 1

Chemical composition of the volume of one or more chemical additives

| CAS # | Component | Percent by Weight |
|---|---|---|
| 9003-53-6 | Polystyrene | >60% |
| 646-29-7 | Stearate | 0-8% |
| 68187-51-9 | Zinc Ferrite | 8-10% |
| 68186-90-3 | Mixed Metal Oxide | 16-17% |
| 557-05-1 | Zinc Stearate | 3-4% |
| — | Coloring Agent | 0-1% |

As shown in Table 1, the volume of one or more chemical additives may include approximately 60% by weight or greater of polystyrene (CAS #9003-53-6), 0-8% by weight of stearate (CAS #646-29-7), 8-10% by weight of zinc ferrite (CAS #68187-51-9), 16-17% by weight of mixed metal oxides (CAS #68186-90-3), and 3-4% by weight of zinc stearate (CAS #557-05-1). The volume of one or more chemical additives may further include 0-1% by weight of coloring agents. For example, the volume of one or more chemical additives may further include 0-1% by weight of phthalocyanine blue (CAS #147-14-8).

In embodiments, the volume of one or more chemical additives may further include one or more additional additives including, but are not limited to, antioxidants, oxidants, ultraviolet (UV) stabilizing additives, and processing aides. For example, the volume of one or more chemical additives may further include 0-1% by weight of antioxidants, oxidants, ultraviolet (UV) stabilizing additives, and processing aides.

In some embodiments, the volume of one or more chemical additives provided may be dependent upon a desired composition of the additional additives to the volume of polystyrene provided in step 102. In this regard, the volume of one or more chemical additives added in step 104 may be dependent upon the volume by weight of additional additives (e.g., antioxidants, oxidants, ultraviolet (UV) stabilizing additives, and processing aides).

It is noted herein that the inclusion of one or more chemical additives provided in step 104 may serve as an oxidizing agent and catalyze degradation of the molecular bonds within oxo-biodegradable EPS products formed by method 100. In particular, the one or more additional additives used in the production of the oxo-EPS product may incorporate oxygen into the chemical structure of the final oxo-EPS product. This oxygen in the chemical structure may promote oxidation of the oxo-EPS product, thereby leading to the molecular break-down of the oxo-EPS product. The included oxygen may gradually change the oxo-EPS product from a hydrophobic substance (water repellent substance) to a hydrophilic substance (water soluble substance). Microorganisms, which are prevalent in everyday life as well as landfills, may then complete the biodegradation process by metabolizing the remaining polymer structure as food. After metabolizing the oxidized oxo-EPS product, the microorganisms may expel carbon dioxide ($CO_2$), water ($H_2O$), and biomass (e.g., humus waste).

It is noted herein that the volume of one or more chemical additives (shown in Table 1) used throughout the present disclosure has been extensively studied and tested. Additionally, the one or more chemical additives have been 17025 ISO certified for contact with food and beverages. The one or more chemical additives have been found to be environmentally friendly in that they are non-toxic and do not contain any regulated heavy metals. Furthermore, there has been extensive research and testing which has shown that soils affected by the microorganisms which metabolize the oxo-EPS product are non-harmful to sensitive plant, animal, and aquatic life. Such findings have also been 17025 ISO certified.

It is further noted herein that the volume of one or more chemical additives may include polystyrene. In this regard, providing the volume of one or more chemical additives in step 104 may include mixing one or more chemical additives (e.g., stearate, zinc ferrite, mixed metal oxide, zinc stearate, antioxidants, oxidants, coloring agents, and the like) to a first volume of polystyrene.

In a step 106, the volume of polystyrene and the volume of one or more chemical additives are combined to form a mixture. The volumes of polystyrene and chemical additive may be mixed in any manner known in the art including, but not limited to, blending, shaking, stirring, and the like. In this regard, the volume of polystyrene and the volume of one or more chemical additives may be combined into a mixture with a mixer, a blender, a tumbler, and the like. It is noted herein that any apparatus known in the art for combining substances may be used to combine the volumes of polystyrene and chemical additives.

In embodiments, the volume of one or more chemical additives provided may be based on a weight percentage. For example, the volume of one or more chemical additives may be added such that the volume of chemical additives constitutes approximately three percent of the polystyrene/chemical additive mixture.

In a step 108, the mixture is expanded. For example, the mixture may be exposed to steam which causes the mixture to expand.

In a step 110, the mixture is allowed to set up. For example, the mixture may be placed (e.g., poured, blown, scooped, and the like) into a vessel or other container and left to set up for a selected time interval. For instance, the mixture may be blown into a bag and left to sit for a time period of twelve hours.

In a step 112, the mixture is placed into a product mold. The mixture may be placed into a product mold using any technique known in the art including, but not limited to, pouring, blowing, scooping, and the like. It is noted herein that the product mold may include a mold for a wide range of products including, but not limited to, coolers, transportation containers, shipping containers, packaging items, packing peanuts, commercial items, and the like. For example, the mixture may be blown into a product mold for a foam cooler.

In a step 114, the mixture is expanded to form an expanded polystyrene (EPS) product. For example, the mixture may be expanded to form an oxo-EPS product. It is noted herein that expanding a mixture within a product mold may cause the mixture to expand and take the shape of the product mold. For example, the mixture in a foam cooler product mold may be exposed to steam, which causes the mixture to expand and take the shape of a foam cooler.

In a step 116, the EPS product (e.g., oxo-EPS product) is removed from the product mold.

It is contemplated herein that the oxidation of the oxo-EPS product produced by method 100 with the volume of one or more chemical additives effectively speeds up the biodegradation of traditional EPS products from several hundred years, to only a couple years (e.g., 2-3 years). After several years in a proper landfill (e.g., bioreactor landfill), the oxo-EPS product may naturally biodegrade into carbon dioxide ($CO_2$), water ($H_2O$), and biomass (e.g., compost, waste, and the like). By significantly expediting biodegradation timeframes, and producing only carbon dioxide ($CO_2$), water ($H_2O$), and biomass as byproducts, the oxo-EPS product of the present disclosure may provide countless environmental advantages over previous EPS products.

For example, the shorter biodegradation process (e.g., 2-3 years) of the oxo-EPS product may be advantageous for a wide variety of commercial applications. Many current EPS products are not sold, shipped, or otherwise used immediately after they are produced. As such, with a biodegradation timeframe of 2-3 years, oxo-EPS product may be produced and stored for a reasonable period of time before the degradation process will begin, thereby preserving the shelf-life of current EPS products while improving the biodegradable characteristics.

Additionally, the method 100 for producing the oxo-EPS product of the present disclosure utilizes only a small amount of oil. In another embodiment, the method includes the use of steam, which may be condensed, collected, and reused repeatedly. The condensation, collection, and reuse of steam is not only environmentally friendly and responsible, but it also increases the efficiency of the method overall.

In one embodiment, oxo-EPS product does not contain some harmful compounds contained in other plastics including, but not limited to, chlorofluorocarbon (CFC), hydrochlorofluorocarbon (HCFC), hydrofluorocarbon (HFC), formaldehyde, and the like. In another embodiment, the oxo-EPS products may be inert and not harmful to the ozone layer.

Even with enhanced biodegradable characteristics, oxo-EPS products of the present disclosure may be completely recyclable. Indeed, just as with traditional EPS products, the preferred disposal method of the oxo-EPS product may be recycling. Similar to traditional EPS products, the oxo-EPS product may be recycled in numerous locations including, but not limited to, via postindustrial/consumer waste streams (e.g., established EPS recycling locations), at the manufacturing location, at the construction job site, and the like. Furthermore, oxo-EPS products of the present disclosure may be recycled by a number of processes. For example, oxo-EPS products may be granulated and formed into other oxo-EPS products. By way of another example, oxo-EPS products may be thermally re-processed into new resins, which may then be used in a wide variety of fields or applications.

Next in line in a list of preferred oxo-EPS product disposal methods may be disposal in a modern bioreactor landfill. The oxo-EPS products disposed of in a modern bioreactor landfill may rapidly biodegrade into organic waste over a period of only 2-3 years, as opposed to the several hundred year biodegradation timeframe of traditional EFS products.

Ending the list of preferred disposal methods for the oxo-EPS products is disposal in other manners, including disposal in nature or traditional landfills. However, it is noted herein that even if the oxo-EPS products of the present disclosure are not recycled or disposed in bioreactor landfills, the oxidized oxo-EPS products may still degrade and biodegrade at a significantly faster rate as compared to traditional EPS products. Furthermore, unlike many other materials which require specific biodegradation conditions to degrade and/or biodegrade, the oxo-EPS products of the present disclosure may biodegrade even in nature, without such specialized or manufactured conditions. Thus, even with the least-preferred disposal method, oxo-EPS products provide numerous environmental advantages.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

What is claimed:

1. A method for producing an oxo-biodegradable expanded polystyrene (EPS) product, comprising:
   providing a volume of polystyrene;
   providing one or more additives;
   combining the volume of polystyrene and the one or more additives to form a mixture, wherein the one or more additives are present, cumulatively, in an amount of 1 to 5% by weight of the mixture; and
   expanding the mixture into an oxo-biodegradable expanded polystyrene (EPS) product,
   wherein the one or more additives, being the 1 to 5% by weight of the mixture, includes at least one of zinc ferrite, or mixed metal oxide.

2. The method of claim 1, wherein the one or more additives includes, by weight as a percentage of the one or more additives, 8 to 10% zinc ferrite, 16 to 17% mixed metal oxide, 3 to 4% zinc stearate, and at least 60% of a second polystyrene.

3. The method of claim 2, wherein the one or more additives further includes at least one of an antioxidant, an oxidant, or an ultraviolet (UV) stabilizing additive.

4. The method of claim 2, wherein the one or more additives further includes stearate.

5. The method of claim 1, wherein the one or more additives is 17025 ISO certified.

6. The method of claim 2, wherein the one or more additives are present, cumulatively, in an amount of 3% by weight of the mixture.

7. The method of claim 1, wherein the oxo-biodegradable expanded polystyrene (EPS) product includes 91% or more polystyrene by weight.

8. The method of claim 1, wherein providing the volume of polystyrene comprises:
   providing a volume of polystyrene beads.

9. The method of claim 1, wherein providing the volume of polystyrene comprises:
   providing a volume of polystyrene beads impregnated with a volume of pentane gas.

10. The method of claim 1, further comprising:
    transferring the mixture into a product mold; and
    expanding the mixture into an oxo-biodegradable EPS product within the product mold.

11. The method of claim 1, wherein expanding the mixture comprises:
    exposing the mixture to steam.

12. The method of claim 10, wherein transferring the mixture into the product mold comprises at least one of blowing, pouring, or scooping the mixture into the product mold.

13. The method of claim 12, wherein the product mold comprises at least one of a beverage cooler product mold, a transportation container product mold, or a packing peanut product mold.

14. The method of claim 1, wherein the combining the volume of polystyrene and the one or more additives into the mixture is performed via:
    at least one of a mixer, a blender or a tumbler.

15. The method of claim 1, wherein the oxo-biodegradable EPS product is configured to biodegrade in a period between one and three years.

16. An oxo-biodegradable expanded polystyrene (EPS) product formed by a process, the process comprising:
- providing a volume of polystyrene;
- providing one or more additives;
- combining the volume of polystyrene and the one or more additives to form a mixture, wherein the one or more additives are present, cumulatively, in an amount of 0.1 to 5% by weight of the mixture; and
- expanding the mixture into an oxo-biodegradable expanded polystyrene (EPS) product,
- wherein the one or more additives, being the 0.1 to 5% by weight of the mixture, includes at least one of zinc ferrite, or mixed metal oxide.

17. The oxo-biodegradable EPS product of claim 16,
- wherein, for the mixture, the volume of polystyrene is present in an amount of 95 to 99% by weight of the mixture,
- wherein, for the mixture, the zinc ferrite is present in an amount of 8 to 10% by weight of the one or more additives, and
- wherein, for the mixture, the mixed metal oxide is present in an amount of 16 to 17% by weight of the one or more additives.

* * * * *